United States Patent
McEwan (10) Patent No.: US 7,516,546 B2
(45) Date of Patent: Apr. 14, 2009

(54) METHOD OF MANUFACTURING A CONNECTING ROD ASSEMBLY FOR AN INTERNAL COMBUSTION ENGINE

(75) Inventor: Alan Stephen McEwan, South Lyon, MI (US)

(73) Assignee: MAHLE Technology, Inc., Farmington Hills, MI (US)

( * ) Notice: Subject to any disclaimer, the term of this patent is extended or adjusted under 35 U.S.C. 154(b) by 759 days.

(21) Appl. No.: 10/990,135

(22) Filed: Nov. 16, 2004

(65) Prior Publication Data

US 2006/0101642 A1    May 18, 2006

(51) Int. Cl.
B21D 53/84 (2006.01)
B23D 13/04 (2006.01)
B23P 11/02 (2006.01)
F16C 7/00 (2006.01)
F16C 7/02 (2006.01)
F16J 1/14 (2006.01)

(52) U.S. Cl. .............. 29/888.09; 29/888.092; 29/557; 29/525; 29/447; 74/579 R; 74/579 E; 92/179; 92/187; 92/230; 92/238; 123/197.3; 123/197.4

(58) Field of Classification Search ............ 29/898.13, 29/888.092, 88.091, 557, 525; 74/579 R, 74/579 E; 92/179, 187, 208, 230, 238; 123/48 B, 123/78 E, 197.3, 197.4
See application file for complete search history.

(56) References Cited

U.S. PATENT DOCUMENTS

| | | | |
|---|---|---|---|
| 448,766 A | 3/1891 | Kelliher | |
| 491,974 A | 2/1893 | Barler | |
| 1,491,155 A | 4/1924 | McKone | 92/187 |
| 1,959,279 A | 5/1934 | Ballou | 92/157 |
| 2,202,773 A | 5/1940 | Given | 308/241 |
| 3,479,929 A | 11/1969 | Fangman | 92/187 |
| 3,935,797 A | 2/1976 | Niimi et al. | 92/223 |
| 3,971,355 A * | 7/1976 | Kottmann | 123/197.2 |
| 4,233,088 A | 11/1980 | Kronstein | 428/472.3 |
| 4,388,523 A * | 6/1983 | Keep et al. | 219/541 |
| 4,430,906 A * | 2/1984 | Holtzberg et al. | 74/595 |
| 4,709,620 A * | 12/1987 | Mielke | 92/187 |
| 4,863,513 A | 9/1989 | Umeha et al. | 75/231 |
| 4,974,498 A * | 12/1990 | Lemelson | 92/223 |
| 4,984,544 A | 1/1991 | DeBiasse | 123/197.4 |
| 5,039,285 A | 8/1991 | Lindstrom | 417/368 |
| 5,081,967 A | 1/1992 | Kemnitz et al. | 123/193.6 |
| 5,158,695 A | 10/1992 | Yashchenko et al. | 252/30 |
| 5,257,603 A | 11/1993 | Bauer et al. | 123/193 |

(Continued)

Primary Examiner—David P Bryant
Assistant Examiner—Alexander P Taousakis
(74) Attorney, Agent, or Firm—Bliss McGlynn, P.C.

(57) ABSTRACT

The present invention relates to a method of manufacturing a connecting rod assembly having a stepped small end. The method includes defining a small end of a connecting rod assembly having a terminal end and defining a pin bore extending therethrough. A pair of channels are formed on opposite sides of the small end, perpendicular to the pin bore and a bushing is subsequently installed into the pin bore. Where a connecting rod assembly does not include a bushing the method includes defining a small end having a pin bore and forming pair of channels on opposite sides of the small end. A contact surface is then defined within the pin bore to engage a piston pin and the small end is machined to provide a stepped configuration. The connecting rod assembly is then machined to reduce the width of the small end to provide a stepped configuration.

19 Claims, 4 Drawing Sheets

U.S. PATENT DOCUMENTS

| | | | |
|---|---|---|---|
| 5,352,541 A | 10/1994 | Tanaka et al. | 428/628 |
| 5,549,034 A | 8/1996 | Loughlin | 92/187 |
| 5,592,927 A | 1/1997 | Zaluzec et al. | 123/668 |
| 5,613,182 A * | 3/1997 | Lynn | 419/28 |
| 5,661,904 A | 9/1997 | Loughlin | 29/888.01 |
| 5,772,801 A * | 6/1998 | Baldi et al. | 148/552 |
| 5,836,280 A | 11/1998 | Miyazawa | 123/193.4 |
| 5,878,323 A * | 3/1999 | Sakai et al. | 419/28 |
| 6,134,779 A * | 10/2000 | Walker et al. | 29/888.092 |
| RE37,565 E | 3/2002 | Bubeck | 92/216 |
| 6,357,918 B1 | 3/2002 | Kagohara et al. | 384/276 |
| 6,422,755 B1 * | 7/2002 | Cadle et al. | 384/433 |
| 6,427,326 B1 | 8/2002 | Soga et al. | 29/888.092 |
| 6,446,436 B1 | 9/2002 | Winkelmann et al. | 60/533 |
| 6,491,013 B1 | 12/2002 | Gaiser et al. | 123/193.6 |
| 6,497,771 B1 | 12/2002 | Schubach et al. | 148/253 |
| 6,513,477 B1 * | 2/2003 | Gaiser et al. | 123/193.6 |
| 6,539,910 B1 | 4/2003 | Gaiser et al. | 123/193.6 |
| 6,540,403 B1 * | 4/2003 | Damour | 384/276 |
| 6,557,457 B1 * | 5/2003 | Hart et al. | 92/223 |
| 6,579,492 B2 * | 6/2003 | Wehler | 419/28 |
| 6,640,779 B1 | 11/2003 | Thiyagarajan | 123/406.75 |
| 6,769,518 B2 | 8/2004 | Uehara et al. | 188/218 |
| 2005/0160597 A1 * | 7/2005 | Hase | 29/888.09 |

* cited by examiner

METHOD OF MANUFACTURING A CONNECTING ROD ASSEMBLY FOR AN INTERNAL COMBUSTION ENGINE

BACKGROUND OF THE INVENTION

1. Field of the Invention

The present invention relates, generally, to a connecting rod assembly and, more specifically, to a method of manufacturing a connecting rod assembly for an internal combustion engine.

2. Description of the Related Art

Internal combustion engines known in the related art may generally include, among other basic components, an engine block having one or more cylinders, cylinder heads associated with the engine block, pistons supported for reciprocal movement in each cylinder, and connecting rod assemblies to transfer the movement of the pistons to the crankshaft. The piston generally includes a bore that corresponds to a similar pin bore at one end of the connecting rod assembly. A pin is placed through the corresponding bores to attach the piston to the connecting rod assembly. The end of a connecting rod assembly having the pin bore is commonly referred to as the "small end." The other end of a connecting rod assembly is fastened to the crankshaft at a particular location. This end of the connecting rod assembly is commonly referred to as the "crank end" or "large end."

Generally, fuel is combusted within the cylinders to reciprocate the pistons. The piston drives the connecting rod assembly, which drives the crankshaft, causing it to rotate within the engine block. Specifically, as fuel is combusted within the cylinder, the combustion pressure drives the piston downward in a substantially linear motion, which in turn drives the connecting rod assembly in a substantially linear, but slightly rotational motion. On the other hand, the large end of the connecting rod assembly is attached to the crankshaft, which drives the large end of the connecting rod assembly in a substantially rotational motion.

Since it is the connecting rod assembly that transfers the reciprocal motion of the piston into the rotational motion of the crankshaft, the connecting rod assembly incurs a high level of stress at both the large end and small end pivot points. At the small end, the lower surface of the pivot point has to resist a high load from the transfer of the combustion pressure from the piston pin down through the connecting rod. The upper surface of the connecting rod at the small end has to resist a much lower load, which is the result of inertia force from the reciprocating masses during the exhaust stroke.

To optimize efficiency in this location, the small end of the connecting rod assembly may be manufactured to have a reduced width at the upper region with respect to the remaining portion of the small end. One type of connecting rod assembly that has a reduced width small end is commonly referred to as a "stepped" connecting rod assembly. Specifically, the reduced width small end of a connecting rod assembly permits a wider bearing area in the piston and increases the overall load carrying capability while minimizing the overall weight of the piston and connecting rod assembly.

Connecting rod assemblies may also employ a bushing within the pin bore of the small end to facilitate load carrying capacity and seizure resistance. A bushing at this location is often constructed from a dissimilar material to that of the connecting rod assembly to reduce friction and provide smooth angular movement along the pivot point, thereby reducing scuffing which can cause engine damage. As a result, it is often desirous to employ a bushing at the small end of the connecting rod assembly.

However, moment forces are generated during installation of a bushing at the small end of a connecting rod assembly where the upper region of the small end has a reduced width with respect to the remaining portion of the small end. Specifically, during installation, the non-planar area around the pin bore of the stepped small end causes the bushing to shift in a manner where the bushing is no longer parallel with the pin bore. This can result in misalignment between the bushing and pin bore or deformation of the bushing, creating irregular contact between the bushing and the pin bore, which may lead to premature bushing failure. Additionally, this misalignment can translate to an irregular bushing surface that contacts the piston pin, which may promote scuffing and lead to engine damage.

Moment forces are also generated during the machining of the surface within the pin bore of the small end of a connecting rod assembly that contacts a piston pin. This is especially true where the connecting rod assembly has a stepped small end whether or not a bushing is employed within the pin bore. Specifically, the non-planar area around the pin bore of the stepped small end may permit the machining tool to shift while it is cutting and defining the contact surface. This shift has a tendency to create a concave lower surface, which reduces optimum efficiency at this pivot point. The creation of such a non-uniform contact surface may lead to premature failure of the pivot point between the contact surface and the piston pin, which can lead to engine damage.

The irregularities caused by the moment forces associated with installing a bushing in the pin bore of stepped small end of a connecting rod assembly as well as those associated with machining the contact surface in the pin bore are detrimental to the efficiency and cost-effectiveness of manufacturing connecting rod assemblies. Notably, these irregularities impose additional steps in the manufacturing process to inspect connecting rod assemblies and correct the irregularities where appropriate, which increases costs associated with additional labor, additional machining and lost manufacturing. Further, these irregularities can cause an out-of-tolerance condition, rendering the entire connecting rod assembly unusable.

As a result, there is an ongoing need in the art to improve the method of manufacturing a connecting rod assembly, in general. Specifically, there is an ongoing need to streamline the manufacturing process while retaining the advantages of a connecting rod assembly having a stepped small end. Thus, there continues to be a need in the art for a method of manufacturing a connecting rod assembly having a stepped small end that is both cost-effective and time-efficient relative to previous methods of manufacturing same while still maintaining reliability. Further, there is a need in the art to provide a method of manufacturing a connecting rod assembly that essentially eliminates moment forces that occur when the bushing is installed within the pin bore of a stepped small end of a connecting rod assembly. Additionally, there is a need in the art for a method of manufacturing a connecting rod assembly that essentially eliminates moment forces that occur when a contact surface is machined in the stepped small end of a connecting rod assembly.

SUMMARY OF THE INVENTION

The present invention overcomes the disadvantages in the related art for a method of manufacturing a connecting rod assembly including a stepped small end for use in internal combustion engines. To this end, the method of the present invention includes defining a small end of a connecting rod assembly having a terminal end and defining a pin bore extending through the small end of the connecting rod assembly. Once the small end of the connecting rod assembly is defined, a pair of channels are formed on opposite sides of the small end of the connecting rod assembly where the axis of each of the channels is substantially perpendicular to the axis of the pin bore. A bushing is subsequently installed into the pin bore of the small end. Once the bushing is installed into the pin bore, the connecting rod assembly is machined to reduce the width of the small end between each channel and the terminal end to provide a small end having a stepped configuration.

Another method of manufacturing a connecting rod assembly according to the present invention includes defining a small end of a connecting rod assembly having a terminal end and defining a pin bore extending through the small end of the connecting rod assembly. Once the small end of the connecting rod assembly is defined, a pair of channels are formed on opposite sides of the small end of the connecting rod assembly where the axis of each of the channels is substantially perpendicular to the axis of the pin bore. A contact surface is subsequently defined within the pin bore of the small end to operatively engage a piston pin. Once the contact surface is defined, the connecting rod assembly is machined to reduce the width of the small end between each channel and the terminal end to provide a small end having a stepped configuration.

Accordingly, one advantage of the present invention is that it essentially eliminates the moment forces generated when installing a bushing into a pin bore of a stepped small end of a connecting rod assembly, thereby reducing the likelihood of deforming the bushing and creating an irregular contact area between the bushing and connecting rod assembly pin bore.

Another advantage of the present invention is that it reduces the moment forces generated when defining a contact surface within the pin bore of a stepped small end of a connecting rod assembly that receives a piston pin, thereby reducing the likelihood of deforming the distal ends of the contact surface and creating an irregular pivot point between the contact surface and the piston pin.

Still another advantage of the present invention is that it streamlines the manufacture of a connecting rod assembly by reducing the need for inspecting and correcting irregularities caused by moment forces generated during installation of a bushing.

Still another advantage of the present invention is that it streamlines the manufacture of a connecting rod assembly and connecting rod assembly by reducing the need for inspecting and correcting irregularities caused by moment forces generated during machining to define a contact surface within the small end that engages a piston pin.

Other objects, features, and advantages of the present invention will be readily appreciated as the same becomes better understood, after reading the subsequent description taken in conjunction with the accompanying drawings.

DETAILED DESCRIPTION OF THE INVENTION

Figure 1:
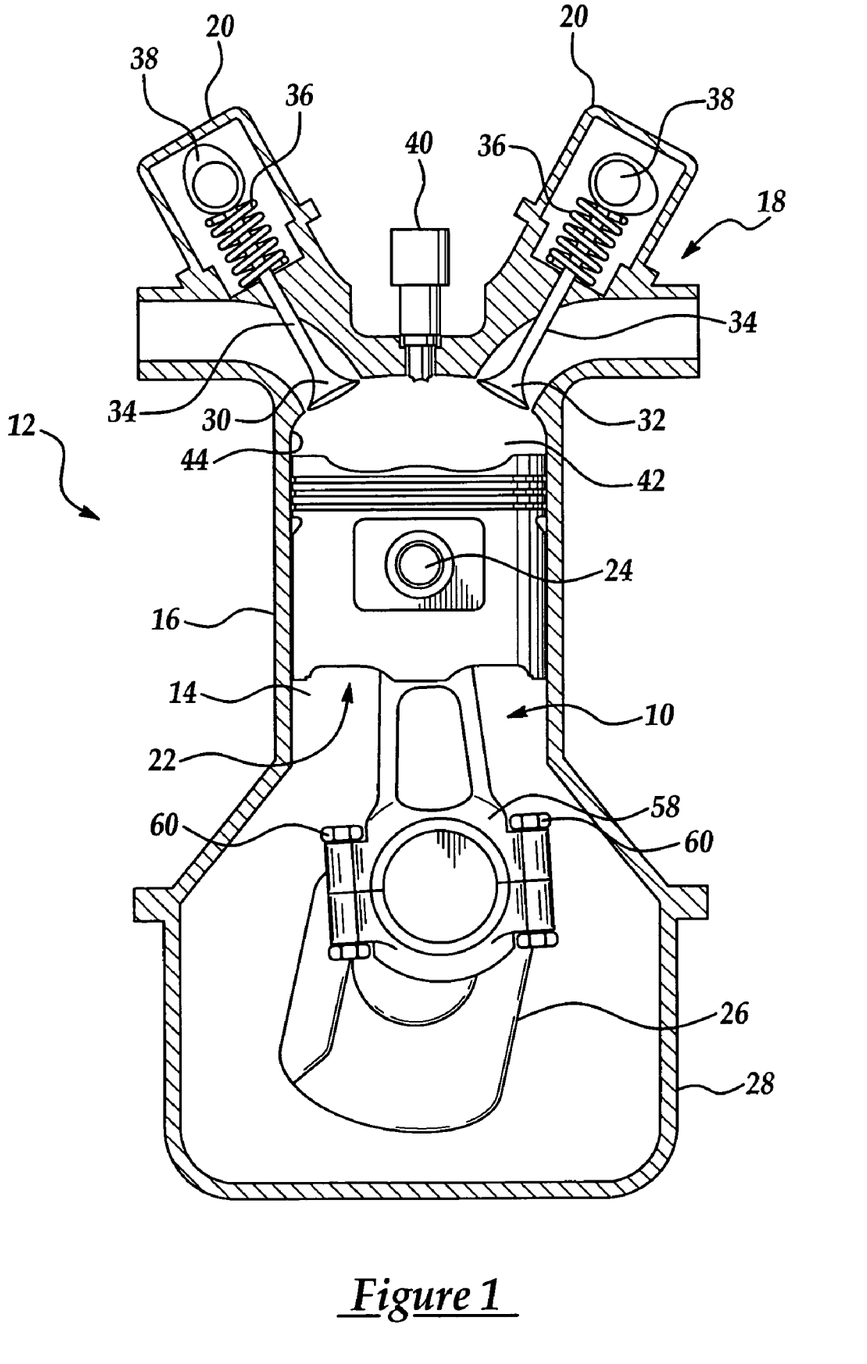
FIG. 1 is a cross-sectional environmental view of an internal combustion engine including a connecting rod assembly manufactured pursuant to the method of the present invention.

A connecting rod assembly manufactured pursuant to the method of the present invention is generally indicated at 10 throughout the figures, where like numbers are used to designate like structures throughout the drawings. As shown in FIG. 1, the present invention is particularly adapted for use in an internal combustion engine, generally indicated at 12. In this case, the assembly 10 of the present invention is illustrated in connection with a single cylinder 14 of an internal combustion engine 12 having a dual-overhead cam arrangement. Those having ordinary skill in the art will appreciate that the engine 12 is but one of the many internal combustion engines with which the present invention may be employed. By way of example, the present invention may be employed to manufacture a connecting rod assembly used in a two-stroke or four-stroke engine. The cylinders may be arranged in an in-line, v-shaped, or flat manner or in any other manner commonly known in the art. The present invention may also be employed with a carbureted or fuel injected internal combustion engine having single or dual overhead or undermounted cam(s).

With continuing reference to FIG. 1, the internal combustion engine 12 includes an engine block 16 having one or more cylinders 14, and a cylinder head generally indicated at 18 associated with the engine block 16. Rocker panels 20 are associated with the cylinder head 18 in a manner commonly known in the art. A piston, generally indicated at 22, is supported for reciprocal movement in a cylinder 14. The connecting rod assembly 10 is secured to the piston 22 through a piston pin 24 as will be explained in greater detail below. A crankshaft 26 is associated with the connecting rod assembly 10 and an oil pan 28 is associated with the engine block 16. An intake valve 30 and an exhaust valve 32, each having valve stems 34 and valve springs 36 are supported in the cylinder head 18 and are opened and closed via cams 38 to provide fluid communication between the cylinder 14 and the intake valve 30 and the exhaust valve 32. The internal combustion engine 12 also includes a spark plug 40 for igniting the fuel within the combustion chamber 42 defined by the cylinder walls 44 and above the piston 22. Alternatively, or in addition, the engine 12 may include a fuel injector (not shown) as a means of introducing atomized fuel into the combustion chamber 42. Thus, the present invention may be employed in connection with both a spark ignition or compression ignition (diesel) engine. Those having ordinary skill in the art will appreciate that the engine 12 also includes a number of other conventional components that are commonly known in the art and that will not be described in detail here.

Generally, fuel is combusted within the combustion chamber 42 of a cylinder 14 to reciprocate the piston 22. The piston 22 drives the connecting rod assembly 10, which drives the crankshaft 26, causing it to rotate within the engine block 16. Specifically, the combustion pressure within the cylinder 14 drives the piston 22 downward in a substantially linear, but slightly rotational motion. On the other hand, movement of the crankshaft 26 drives the connecting rod assembly 10 in a substantially rotational motion.

Figure 2:
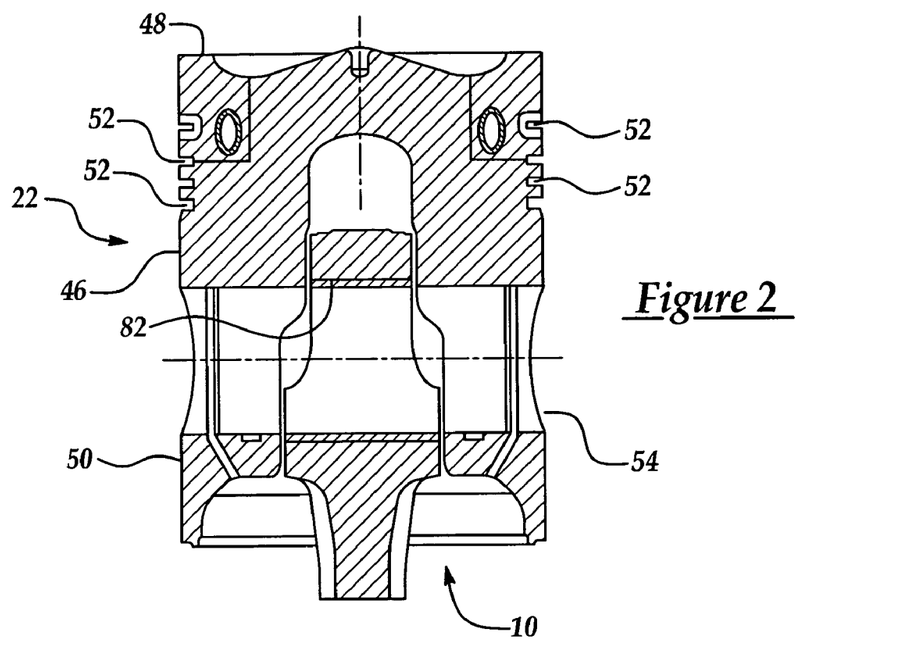
FIG. 2 is an enlarged cross-sectional view of the connecting rod assembly manufactured pursuant to the method of the present invention and shown secured to a piston.

As shown in FIG. 2, the piston 22 includes a body 46 having a crown 48 formed at the uppermost margins of the body 46 and a skirt 50 depending from the crown 48. Ring lands 52 extend about the outer circumference of the body 46 between the crown 48 and the skirt 50. The ring lands 52 are adapted to retain piston rings (not shown, but generally known in the art). The body 46 further includes a bore 54 formed therein. As shown in the figures, the bore 54 includes a substantially circular circumference. However, those having ordinary skill in the art will appreciate that the bore 54 may include a variety of shapes. By way of example the bore 54 may include a substantially oval circumference. The bore 54 is adapted to receive the piston pin 24. Those having ordinary skill in the art will appreciate that pistons can have many different shapes, sizes, and other structural features. By way of example, the pistons 22 may include any number of ring lands 52, or protrusions and/or recesses on the crown 48 for facilitating the combustion process and enhancing the power or efficiency derived therefrom. Furthermore, the piston 22 may include recesses or grooves formed on the piston skirt 50 or a coating applied to the piston skirt 50. Still further, pistons 22 may include a burnished or chamfered bore. The bore 54 may also include side reliefs (not shown) for receiving lubrication between the bore 54 and piston pin 24. The piston pin 24 is often cylindrical in shape and includes a substantially uniform diameter. This shape has been adopted as the standard for most applications. However, those having ordinary skill in the art will appreciate that the piston pin 24 may include a center area having a reduced diameter with respect to the diameter of the distal ends. Accordingly, the connecting rod assembly 10 may accommodate either variety of piston pin 24.

As mentioned above, the connecting rod assembly 10 is adapted to interconnect the piston 22 and the crankshaft 26 so as to translate the reciprocal movement of the piston 22 into rotational movement of the crankshaft 26. To this end, the connecting rod assembly 10 includes a small end, generally indicated at 56, secured to the piston 22 via the piston pin 26 and a large or crank end 58 operatively secured to the crankshaft 26 through bolts 60. The small end 56 includes a terminal end 62 and a pin bore, generally indicated at 64, extending therethrough.

Figure 3A:
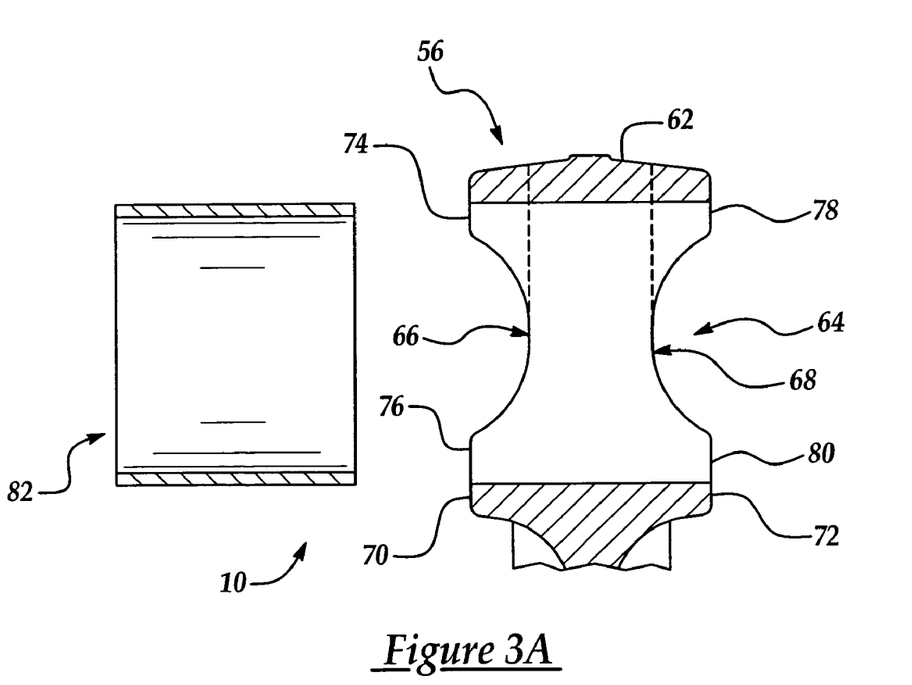
FIG. 3A is an exploded, fragmentary cross-sectional view of the small end of the connecting rod assembly with formed channels but prior to installation of a bushing and final machining, with the final machining lines shown in phantom, in accordance with the present invention.
Figure 3B:
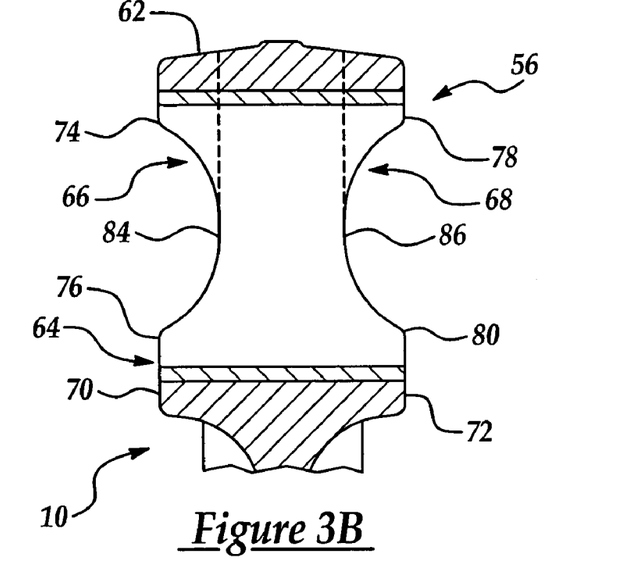
FIG. 3B is a fragmentary cross-sectional view of the small end of the connecting rod assembly after the bushing has been inserted but prior to final machining with the final machining lines shown in phantom in accordance with the present invention.

Referring to FIGS. 3A and 3B, the connecting rod assembly 10 manufactured according to the method of the present invention includes a pair of channels, generally indicated at 66 and 68, on opposite sides 70, 72 of the small end 56. The sides 70, 72 on which the channels 66, 68 are located are the sides through which the pin bore 64 extends, such that the axis of each of the channels 66, 68 is substantially parallel to each other and perpendicular to the axis of the pin bore 64. Each of the channels 66, 68 includes a pair of ridges 74, 76, 78, 80 on opposite sides of the pin bore 64. The ridges 74, 76 and 78, 80 for each channel 66, 68 respectively, are coplanar to reduce or eliminate any moment force that may be generated when a bushing, to be described in greater detail below, is installed into the pin bore 64, thereby reducing misalignment between the bushing and pin bore 64 and deformation of the bushing. Additionally, the ridges 74, 76, 78, 80 reduce or eliminate any moment force that may be generated when the contact surface within the small end 56 is defined by machining or otherwise, as will be described in greater detail below.

The connecting rod assembly 10 further includes a bushing, generally indicated at 82. The bushing 82 includes a predetermined outer diameter to facilitate installation of the bushing 82 in a fixed position within the pin bore 64, as described in greater detail below. The bushing 82 may include predetermined contours 84, 86 which correspond to the contour of the opposed channels 66, 68 respectively, as shown in FIG. 3B. On the other hand, the bushing 82 that does not have predetermined contours as shown in FIG. 3A may also be employed.

Referring to FIGS. 3-5B, the bushing 82 further includes a contact surface 88 that is disposed for rotational contact with the piston pin 24, thereby interconnecting the connecting rod assembly 10 to the piston 22. The contact surface 88 defines a pivot axis about which the piston pin 24 may rotate during movement of the piston 22 and connecting rod assembly 10 within the cylinder 14. To perform the desired objectives of countering high loads, facilitating load carrying capacity and resisting seizure, the bushing 82 may be constructed from a metal that is dissimilar from that of the connecting rod assembly 10, which reduces friction and scuffing that might otherwise occur between the piston pin 24 and the pin bore 64. However, those having ordinary skill in the art will appreciate that a bushing 82 constructed from a polymer may also be employed to accomplish a similar end, where the polymer material is suitable for use within an internal combustion engine 12. Further, the bushing 82 may be constructed from a rolled material or flat stock material and subsequently worked to provide the substantially cylindrical shape corresponding to the inner circumference of the pin bore 64.

In the embodiment illustrated in FIGS. 2-5B, the connecting rod assembly 10 includes a bushing 82. However, there exist situations where it is desirous to employ a connecting rod assembly without a bushing 82. Accordingly, another connecting rod assembly manufactured according to the method of the present invention is generally indicated at 110 in FIG. 6 where like numerals, increased by 100 with respect to the embodiment of the invention illustrated in FIGS. 2-5B, are used to designate like structure. The connecting rod assembly 110 is similar to the connecting rod assembly 10 shown in FIGS. 2-5 and so the description of the illustrated structure will not be repeated here except where expressly mentioned below.

Figure 6:
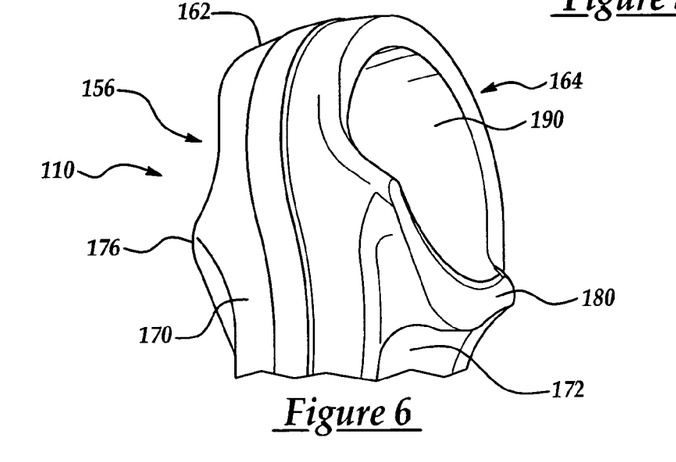
FIG. 6 is a fragmentary perspective view of the small end of another connecting rod assembly manufactured pursuant to the method of the present invention.

Referring to FIG. 6, the connecting rod assembly 110 is shown having a small end 156 including a terminal end 162 and pin bore 164 extending therethrough. In this embodiment, the inner circumference of the pin bore 164 is substantially cylindrical. However, those having ordinary skill in the art will appreciate that the inner circumference of the pin bore 164 may also define a number of other shapes. By way of example, the inner circumference of the pin bore 164 may be substantially oval or include a tapered profile to accommodate a particular style of piston pin 24. The pin bore 164 further includes a contact surface 190 that operatively engages the piston pin 24, thereby interconnecting the connecting rod assembly 110 to the piston 22. The contact surface 190 is defined to provide a pivot surface between the connecting rod assembly 110 and the piston pin 24 to facilitate smooth linear and rotational movement of same within the cylinder 14 during engine 12 operation.

Referring to FIGS. 3A-5B, the method of manufacturing the connecting rod assembly 10 of the present invention includes defining the small end 56 having a terminal end 62. The small end 56 may be defined by any suitable process known in the art. By way of example, the small end 56 may be defined via forging, casting or powder metallurgy. The pin bore 64 is also defined within the small end 56, which may be preliminarily formed during this initial step of forging, casting, or powder metallurgy and later finish machined into the small end 56.

Where forging is employed, the step of defining the small end 56 includes heating a metal blank in to temperature where the metal may be pressed, stamped, or pounded into a predetermined form. The metal blank may then be placed into a die cavity having a predetermined form and subsequently forged to correspond to the predetermined form of the die cavity. Where casting is employed, the step of defining the small end 56 includes pouring molten metal into a mold cavity having a predetermined form and allowing the molten metal to cool to conform to the predetermined form of the mold cavity. Where powder metallurgy is employed, the step of defining the small end 56 includes compressing a metal powder within a die cavity to define a predetermined form and sintering the compressed powder to bond and conform the powder metal to the predetermined form of the die cavity. Those having ordinary skill in the art will appreciate that the connecting rod assembly 10 may also be machined from metal stock.

Once the small end 56 is defined, the method of the present invention includes forming a pair of channels 66, 68 on opposite sides 70, 72 of the small end 56 such that the axis of each of the channels 66, 68 is perpendicular to the axis of the pin bore 64. Those having ordinary skill in the art will appreciate that where the forging process is employed to define the small end 56, the channels 66, 68 may be simultaneously forged therewith. Further, where casting or powder metallurgy is employed to define the small end 56, the channels 66, 68 may be incorporated during either of these processes.

A bushing 82 is then installed into the pin bore 64 of the small end 56. The bushing 82 is positioned in relative proximity to the pin bore 64 such that the axis of the pin bore 64 and the axis of the bushing 82 are substantially aligned. Specifically, the bushing 82 is positioned adjacent the ridges 74, 76 or 78, 80 of a channel 66 or 68, respectively, and inserted into the pin bore 64 until the bushing 82 is centered within in the pin bore 64. The bushing 82 is mechanically pressed into the pin bore 64 to provide an interference fit between the bushing 82 and the pin bore 64, thereby maintaining the bushing 82 in a fixed position relative to the pin bore 64. In order to provide the interference fit between the bushing 82 and the pin bore 64, the outer diameter of the bushing 82 vary within micrometers relative to the inner diameter of the pin bore 64. However, the difference in diameters may not be so great as to compromise the fixed position of the bushing 82 relative to the pin bore 64 necessary during engine 12 operation.

The bushing 82 may also be installed into the pin bore 64 by creating a temperature differential between the bushing 82 and the small end 56. Accordingly, heating the small end 56 to provide thermal expansion of the pin bore 64 or cooling the bushing 82 to provide thermal contraction, or both, will affect the desired temperature differential and assist in the installation process. Specifically, under the effected temperature differential, the outer diameter of the bushing 82 will reduce and the inner diameter of the pin bore 64 will expand, thereby enabling the bushing 82 to be inserted within the pin bore 64. Upon achieving temperature equilibrium between the two components, the bushing 82 is fixed within the pin bore 64.

Those having ordinary skill in the art will appreciate that the above-identified methods of installing a bushing 82 into a pin bore 64 are exemplary and that the step of installing a bushing 82 within a pin bore 64 may be accomplished by several different methods.

Figure 4:
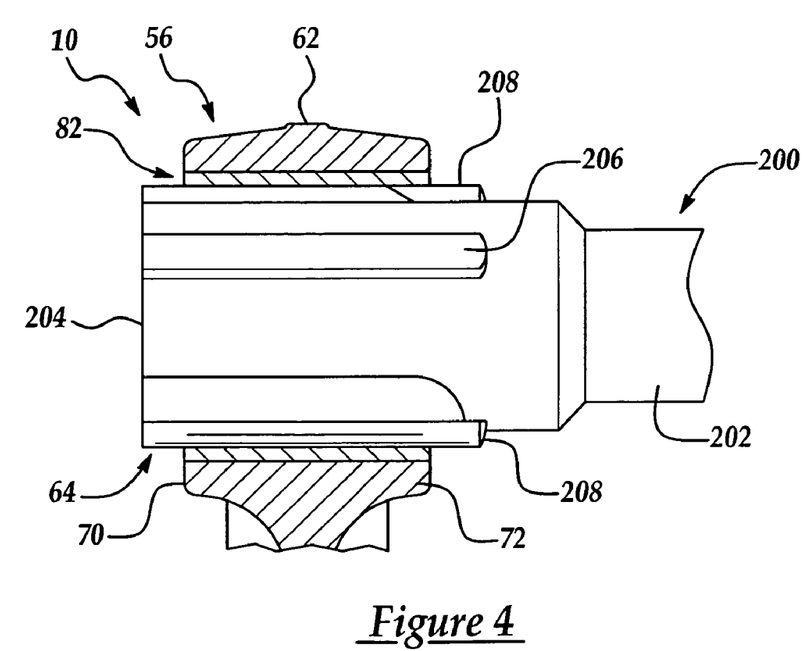
FIG. 4 is a fragmentary cross-sectional view of the small end of the connecting rod assembly and illustrating a machining tool to define a contact surface in the small end that engages a piston pin manufactured pursuant to the method of the present invention.
Figure 5A:
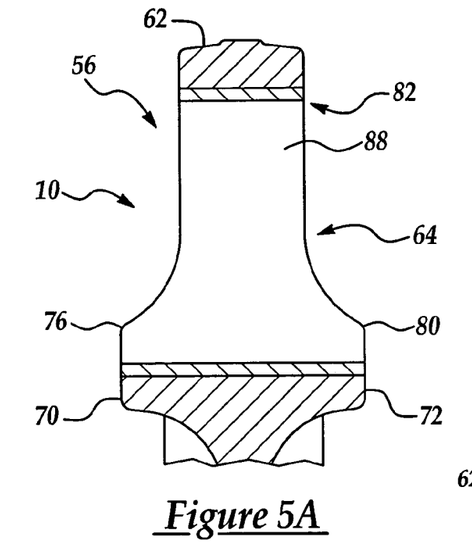
FIG. 5A is a fragmentary cross-sectional view of the small end of the connecting rod assembly manufactured pursuant to the method of the present invention.
Figure 5B:
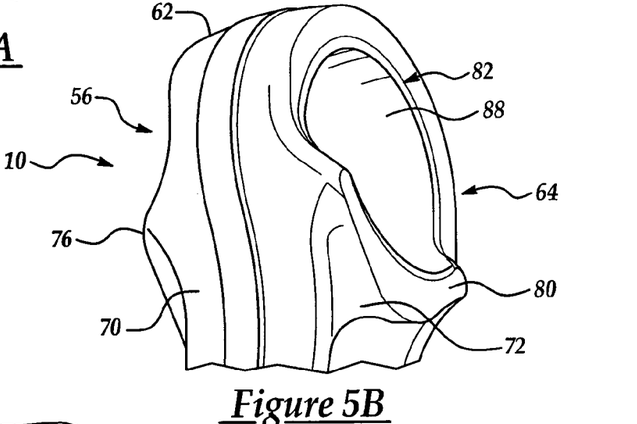
FIG. 5B is a fragmentary perspective view of the small end of a connecting rod assembly manufactured pursuant to the method of the present invention.

Once the bushing 82 is installed into the pin bore 64, a contact surface 88 is defined within the small end 56. Referring to FIGS. 4-5B, a machining tool, generally indicated at 200, engages the inner circumference of the bushing 82 to define the contact surface 88 which facilitates smooth rotational movement of the piston pin 24 during engine 12 operation. As shown in FIG. 4, the machining tool 200 includes a rotary driven shaft 202 and a cutting head 204. The cutting head 204 includes a plurality of pads 206 which support the cutting head 204 during rotational movement within the pin bore 64. The cutting head 204 further includes a plurality of cutting faces 208 that define the contact surface 88. As a result of the channels 66, 68 and the ridges 74, 76 and 78, 80 formed therefrom, the machining tool 200 will finish machine the contact surface 88 to the appropriate inner diameter for a particular application without incurring the moment forces associated with finish machining the contact surface of a small end having a reduced width upper region with respect to the remaining portion of the small end. Those having ordinary skill in the art will appreciate that the contact surface 88 may be defined by any suitable machining tools, such as a CNC machine or other type of cutting tool suitable for defining a contact surface 88 within the small end 56 of a connecting rod assembly 10.

The small end 56 of the connecting rod assembly 10 is subsequently machined to reduce the width between each channel 66, 68 and the terminal end 62, thereby providing a stepped configuration. Specifically, the small end 56 is machined to remove a predetermined portion between the ridges 76, 80 of each channel 66, 68, respectively, and the terminal end 62. Thus, this machining step acts to substantially remove the ridges 74, 78. Whether the bushing 82 is a conventionally shaped bushing or it includes predetermined contours 84, 86 corresponding to the contour of the channels 66, 68, as described with respect to FIGS. 3A and 3B above, a predetermined amount of the bushing 82 is also removed during the machining of the small end 56 to provide the stepped configuration.

Referring to the connecting rod assembly 110 shown in FIG. 6, the method of manufacturing the connecting rod assembly 110 is similar to the connecting rod assembly 10 shown in FIGS. 2-5B and so the description of the method of manufacturing the connecting rod assembly 110 will not be repeated here except where expressly mentioned below.

The method of manufacture represented by the embodiment illustrated in FIG. 6 includes defining a small end 156 of a connecting rod assembly 110 having a terminal 162 and defining a pin bore 164 extending through the small end 156. The small end 156 may be defined by any suitable process known in the art such as forging, casting or powder metallurgy, as described above relative to FIGS. 3A-5B and are incorporated by reference herein. The pin bore 164 defined at the small end 156 may also be formed during the initial step of forging, casting, or powder metallurgy or may be later machined into the small end 156. Once the small end 156 is defined, the method includes forming a pair of channels 166, 168 on opposite sides 170, 172 of the small end 156 such that the axis of each of the channels 166, 168 is perpendicular to the axis of the pin bore 164 as described relative to FIGS. 3A-5B and incorporated by reference herein.

A contact surface 190 is then defined within the pin bore 164 of the small end 156 using a machining tool 200 in substantially the same manner as described relative to FIGS. 4-5B. In one embodiment, the machining tool 200 may include a rotary driven shaft 202 having a plurality of cutting faces 208 that engage the inner circumference of the pin bore 164 to define the contact surface 190 therein. Specifically, as a result of the channels 166, 168 and the ridges 174, 176 and 178, 180 formed therefrom, the machining tool 200 will finish machine the contact surface 190 to the appropriate inner diameter for a particular application without incurring the moment forces associated with finish machining the contact surface of a small end having a reduced width upper region with respect to the remaining portion of the small end.

The small end 156 of the connecting rod assembly 110 is subsequently machined to reduce the width between each channel 166, 168 and the terminal end 162, thereby providing a stepped configuration. Specifically, the small end 156 is machined to remove a predetermined portion between the ridges 176, 180 of each channel 166, 168, respectively, and the terminal end 162 as described above with respect to FIGS. 4-5B and incorporated by reference herein.

The stepped configuration of the small end 56, 156 of the connecting rod assembly 10, 110 which increases the overall load carrying capability while minimizing the overall weight of the piston and connecting rod assembly. In the absence of such properties, the piston 22 and connecting rod assembly 10, 110 may scuff and ultimately fail. Likewise it is important to facilitate load carrying capacity and seizure resistance within the pin bore 64, 164 of the small end 56, 156 to maintain the pivot point between the connecting rod assembly 10, 110, piston 22, and piston pin 24.

Accordingly, the method of the present invention overcomes the disadvantages of the related art and improves installation of a bushing 82 into a pin bore 64 of a connecting rod assembly 10 having a stepped small end 56, thereby prolonging the life of the relative components of an internal combustion engine 12 without undue wear resulting in out-of-tolerance conditions. Further, the pair of channels 66, 68 on opposite sides 70, 72 respectively, of the small end 56 provide a coplanar area adjacent the pin bore 64 that act to reduce the moment forces generated when installing the bushing 82 into the pin bore 64, thereby reducing the likelihood of deforming the bushing 82 and creating an irregular contact area 88 between the bushing 82 and connecting rod assembly pin bore 64.

Further, the pair of channels 66, 68 and 166, 168 on opposite sides 70, 72 and 170, 172 respectively, of the small end 56, 156 provide a coplanar area adjacent the pin bore 64, 164 that act to reduce the moment forces generated when defining a contact surface 88, 190 within the stepped small end 56, 156 of a connecting rod assembly 10, 110 that receives a piston pin 24, thereby reducing the likelihood of deforming the distal ends of the contact surface 88, 190 and creating an irregular pivot point between the contact surface 88, 190 and the piston pin 24. Further, the method of the present invention streamlines the manufacture of a connecting rod assembly 10, 110 by reducing the need for inspecting and correcting irregularities caused by moment forces generated when defining contact surface 88, 190 within the small end 64, 164 that engages a piston pin 24. The manufacture of a connecting rod assembly 10 is further streamlined by the present invention as it reduces the need for inspecting and correcting irregularities caused by moment forces generated during installation of a bushing 82.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A method of manufacturing a connecting rod assembly for use within an internal combustion engine comprising the steps of:
    defining a small end of a connecting rod assembly having a terminal end, defining a pin bore extending through said small end of said connecting rod assembly and forming a pair of channels on opposite sides of said small end of said connecting rod assembly wherein the axis of each of said channels is substantially perpendicular to the axis of said pin bore, and a pair of ridges on opposite sides of said pin bore with each pair of ridges cooperating to define an annular, coplanar platform disposed about the pin bore that acts to reduce moment forces that may be generated when the bushing is installed in the pin bore;
    installing a bushing into the pin bore of the small end and;
    machining the connecting rod assembly to reduce the width of the small end between each channel and the terminal end so as to eliminate one of the ridges on both sides of the small end to provide a small end having a stepped configuration.

2. The method as set forth in claim 1 wherein the step of installing a bushing further includes one or more of the following steps:
    heating the small end of the connecting rod assembly to provide thermal expansion of the pin bore to a predetermined diameter greater than the predetermined outer diameter of the bushing and;
    cooling the bushing to contract the bushing to a predetermined diameter less than the predetermined diameter of the small end pin bore 3. The method as set forth in claim 2 wherein the step of installing a bushing further includes the following steps:
    positioning the bushing in relative proximity to the pin bore of the small end such that the axis of the pin bore and the axis of the bushing substantially align;
    inserting the bushing into the small end pin bore until the bushing is substantially centered within the small end pin bore; and
    affecting a temperature equilibrium between the connecting rod assembly and the bushing to secure the bushing within the small end pin bore of the connecting rod assembly 4. The method as set forth in claim 1 wherein the step of installing a bushing further includes the steps of:
    positioning the bushing in relative proximity to the pin bore of the small end such that the axis of the pin bore and the axis of the bushing substantially align; and
    inserting the bushing into the small end pin bore until the bushing is substantially centered within the small end pin bore.

5. The method as set forth in claim 1 wherein the step of installing a bushing into the pin bore further includes defining the bushing having predetermined contours along opposed sides corresponding to the channels on opposite sides of the small end of the connecting rod assembly prior to machining.

6. The method as set forth in claim 1 wherein said method further includes the step of defining a contact surface within the small end of the connecting rod assembly that operatively engages a piston pin prior to the step of machining the connecting rod assembly to reduce the width of the small end between each channel and the terminal end to provide a small end having a stepped configuration.

7. The method as set forth in claim 6 wherein the step of defining a contact surface further includes machining the inner circumference of the bushing to provide a contact surface adapted to operatively engage a piston pin.

8. The method as set forth in claim 1 wherein the step of machining the connecting rod assembly further includes the step of removing a predetermined amount of material of the connecting rod assembly between the pin bore and the terminal end of the small end to provide a stepped configuration along the small end of the connecting rod assembly.

9. The method as set forth in claim 8 further includes the step of removing a predetermined amount of the bushing to correspond to the stepped configuration of the machined small end.

10. The method as set forth in claim 1 wherein the step of defining a small end of a connecting rod assembly includes:
placing a metal blank within a die cavity having a predetermined form;
pressing the metal blank within the die cavity to confirm to the predetermined form of said die cavity such that the metal blank is forged into a connecting rod assembly; and
removing the forged connecting rod assembly form the die cavity.

11. The method as set forth in claim 1 wherein the step of defining a small end of a connecting rod assembly includes:
placing molten metal into a mold cavity having a predetermined form;
cooling the molten metal within the mold cavity to conform to the predetermined form of the mold cavity such that the molten metal is cast into a connecting rod assembly having a small end and;
removing the connecting rod assembly from the mold cavity.

12. The method as set forth in claim 1 wherein the step of defining a small end of a connecting rod assembly includes:
compressing metal powder within a die cavity defining the predetermined form;
sintering the compressed powder to bond and conform to the predetermined form of the die cavity such that the metal powder is shaped into a connecting rod assembly; and
removing the connecting rod assembly from the mold cavity.

13. A method of manufacturing a connecting rod assembly for use within an internal combustion engine, said method comprising the steps of:
defining a small end of a connecting rod assembly having a terminal end, defining a pin bore extending through said small end of said connecting rod assembly and forming a pair of channels on opposite sides of said small end of said connecting rod assembly wherein the axis of each of said channels is substantially perpendicular to the axis of said pin bore, and a pair of ridges on opposite sides of said pin bore with each pair of ridges cooperating to define an annular, coplanar platform disposed about the pin bore;
defining a contact surface within the pin bore of the small end to operatively engage a piston pin; and
machining the connecting rod assembly to reduce the width of the small end between each channel and the terminal end so as to eliminate one of the ridges on both sides of the small end to provide a small end having a stepped configuration.

14. The method as set forth in claim 13 wherein the step of defining a contact surface within the pin bore of the small end includes machining the inner circumference of a pin bore of the small end of a connecting rod assembly to provide a contact surface to operatively engage a piston pin.

15. The method as set forth in claim 13 wherein the step of machining the connecting rod assembly further includes the step of removing a predetermined amount of material of the connecting rod assembly between the pin bore and the terminal end of the small end to provide a stepped configuration along the small end of the connecting rod assembly.

16. The method as set forth in claim 15 wherein said method further includes the step of removing a predetermined amount of the bushing to correspond to the stepped configuration of the machined small end.

17. The method as set forth in claim 13 wherein the step of defining a small end of a connecting rod assembly includes:
placing a metal blank within a die cavity having a predetermined form;
pressing the metal blank within the die cavity to confirm to the predetermined form of said die cavity such that the metal blank is forged into a connecting rod assembly; and
removing the forged connecting rod assembly form the die cavity.

18. The method as set forth in claim 13 wherein the step of defining a small end of a connecting rod assembly includes:
placing molten metal into a mold cavity having a predetermined form;
cooling the molten metal within the mold cavity to conform to the predetermined form of the mold cavity such that the molten metal is cast into a connecting rod assembly having a small end and;
removing the connecting rod assembly from the mold cavity.

19. The method as set forth in claim 13 wherein the step of defining a small end of a connecting rod assembly includes:
compressing metal powder within a die cavity defining the predetermined form;
sintering the compressed powder to bond and conform to the predetermined form of the die cavity such that the metal powder is shaped into a connecting rod assembly; and
removing the connecting rod assembly from the mold cavity.

* * * * *